(12) United States Patent
Takeuchi

(10) Patent No.: US 10,565,436 B2
(45) Date of Patent: Feb. 18, 2020

(54) INFORMATION PROCESSING DEVICE AND INFORMATION PROCESSING METHOD

(71) Applicant: Sony Corporation, Tokyo (JP)

(72) Inventor: Yuichiro Takeuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 135 days.

(21) Appl. No.: 14/917,487

(22) PCT Filed: Sep. 5, 2014

(86) PCT No.: PCT/JP2014/073570
§ 371 (c)(1),
(2) Date: Mar. 8, 2016

(87) PCT Pub. No.: WO2015/041079
PCT Pub. Date: Mar. 26, 2015

(65) Prior Publication Data
US 2016/0217323 A1 Jul. 28, 2016

(30) Foreign Application Priority Data

Sep. 17, 2013 (JP) .................. 2013-191634

(51) Int. Cl.
*G06K 9/00* (2006.01)
*H04N 13/00* (2018.01)
(Continued)

(52) U.S. Cl.
CPC ..... *G06K 9/00335* (2013.01); *G06K 9/00201* (2013.01); *G06N 7/005* (2013.01);
(Continued)

(58) Field of Classification Search
CPC ........ A63F 13/213; A63F 13/22; A63F 13/25; A63F 13/428; A63F 13/5375; A63F 13/65; G06F 3/011; G06F 3/017; G06F 3/0304; G06K 9/00201; G06K 9/00335; G06K 9/00342; G06N 7/005; G06T 19/006; G06T 9/006; H04N 13/0422; H04N 13/0497; H04N 13/324; H04N 13/398
(Continued)

(56) References Cited

U.S. PATENT DOCUMENTS 5,548,694 A * 8/1996 Frisken Gibson ...... G06T 15/10
345/424
6,362,817 B1 * 3/2002 Powers ................... G06T 17/00
345/419
(Continued)

FOREIGN PATENT DOCUMENTS

| JP | 11-300049 A | 11/1999 |
|---|---|---|
| JP | 2013-520751 A | 6/2013 |
| WO | 2013/118373 A1 | 8/2013 |

*Primary Examiner* — Zhihan Zhou
(74) *Attorney, Agent, or Firm* — Chip Law Group

(57) ABSTRACT

There is provided an information processing device including an action possibility analysis unit configured to acquire data of a three-dimensional shape of an environment, and by breaking down the data of the three-dimensional shape, analyzes an action possibility of the environment for a user, and a picture generation unit configured to use an analysis result of the action possibility analysis unit to generate a picture to project onto the environment.

8 Claims, 11 Drawing Sheets

(51) Int. Cl.
*H04N 13/324* (2018.01)
*H04N 13/398* (2018.01)
*G06N 7/00* (2006.01)
*G06T 19/00* (2011.01)

(52) U.S. Cl.
CPC ......... *G06T 19/006* (2013.01); *H04N 13/324* (2018.05); *H04N 13/398* (2018.05)

(58) Field of Classification Search
USPC .......................................................... 348/51
See application file for complete search history.

(56) References Cited

U.S. PATENT DOCUMENTS

| | | | | |
|---|---|---|---|---|
| 6,712,703 B2* | 3/2004 | Miyamoto | .............. | A63F 13/10 273/108.1 |
| 2002/0155889 A1* | 10/2002 | Miyamoto | .............. | A63F 13/10 463/32 |
| 2009/0066690 A1* | 3/2009 | Harrison | ................ | G06T 19/006 345/419 |
| 2009/0208052 A1* | 8/2009 | Kaplan | ................... | G06F 3/011 382/103 |
| 2014/0063061 A1* | 3/2014 | Reitan | .................... | G09G 3/003 345/633 |
| 2014/0071164 A1* | 3/2014 | Saklatvala | .............. | G06F 3/005 345/633 |
| 2014/0104274 A1* | 4/2014 | Hilliges | .................. | G06F 3/011 345/424 |

* cited by examiner

INFORMATION PROCESSING DEVICE AND INFORMATION PROCESSING METHOD

TECHNICAL FIELD

The present disclosure relates to an information processing device, an information processing method, and a computer program.

BACKGROUND ART

Research is being advanced regarding a technology called a projected augmented reality system that uses a projector to overlay and display virtual information onto objects in the real world (see Patent Literature 1, for example). In the existing research into projected augmented reality systems, there are proposed examples of projecting arrows for user guidance onto floors and walls, displaying objects on a table, applying virtual colors to a model car, and displaying a watch on one's arm by using a compact projector worn around the neck.

CITATION LIST

Patent Literature

Patent Literature 1: JP 2013-520751A

SUMMARY OF INVENTION

Technical Problem

In a projected augmented reality system, the ability to understand the environment is extremely important. This is because with a projected augmented reality system, the projector is movable, and the installation location of the projector is different depending on the user. Consequently, the target of projection which the projector projects onto is not always the same.

People have the ability to simply glance at an environment and be able to judge, to a certain degree, actions that may be taken in that environment. In psychology, the action possibilities which may be perceived from an environment are called affordances. If automatic understanding of such affordances could be applied to a projected augmented reality system, it would be possible to make instantaneous decisions about the picture depending on the target of projection.

Accordingly, the present disclosure proposes a new and improved information processing device, an information processing method, and a computer program able to automatically understand action possibilities of an environment for a person, and reflect such action possibilities in a picture to project.

Solution to Problem

According to the present disclosure, there is provided an information processing device including: an action possibility analysis unit configured to acquire data of a three-dimensional shape of an environment, and by breaking down the data of the three-dimensional shape, analyzes an action possibility of the environment for the user; and a picture generation unit configured to use an analysis result of the action possibility analysis unit to generate a picture to project onto the environment.

According to the present disclosure, there is provided an information processing method including: a step of acquiring data of a three-dimensional shape of an environment, and by breaking down the data of the three-dimensional shape, analyzing an action possibility of the environment for the user; and a step of using the analyzed action possibility to generate a picture to project onto the environment.

According to the present disclosure, there is provided a computer program causing a computer to execute: a step of acquiring data of a three-dimensional shape of an environment, and by breaking down the data of the three-dimensional shape, analyzing an action possibility of the environment for the user; and a step of using the analyzed action possibility to generate a picture to project onto the environment.

Advantageous Effects of Invention

According to the present disclosure as described above, it is possible to provide a new and improved information processing device, information processing method, and computer program able to automatically understand action possibilities of an environment for a person, and reflect such action possibilities in a picture to project.

Note that the effects described above are not necessarily limited, and along with or instead of the effects, any effect that is desired to be introduced in the present specification or other effects that can be expected from the present specification may be exhibited.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Hereinafter, the description will proceed in the following order.
1. Embodiment of present disclosure
  1.1. Overview
  1.2. Example system configuration
  1.3. Example operation
  1.4. Examples of projected pictures
2. Example hardware configuration
3. Conclusion
  <1. Embodiment of Present Disclosure>
  [1.1. Overview]

First, an overview of a projected augmented reality system according to an embodiment of the present disclosure will be described. A projected augmented reality system refers to a system using technology that utilizes a projector to overlay and display virtual information onto objects in the real world. For example, there are proposed examples of displaying navigational arrows onto walls and floors, displaying objects on a table, applying virtual colors to a model car, and displaying a watch on one's arm by using a compact projector worn around the neck.

In consideration of how projector performance improves yearly and the picture quality that may be output from a projector is also improving, it is conceivable that the projection of a virtual picture onto an environment by a portable compact projector may become possible at some point.

For a projected augmented reality system, the ability to understand the environment on which to project a picture is extremely important. With projection mapping, which is a recently-developing technology that projects pictures onto buildings, the target of projection is predefined, and thus it is possible to take time and manually teach the system information about the environment on which to project a picture. However, with a typical projected augmented reality system, the projector is movable, and the installation location of the projector is different depending on the user. Consequently, the target of projection which the projector projects onto is not always the same. For this reason, there is demand for a projected augmented reality system to have the ability to understand the environment automatically.

As discussed above, people have the ability to simply glance at an environment and be able to judge, to a certain degree, actions that may be taken in that environment. The projected augmented reality system according to an embodiment of the present disclosure described hereinafter is characterized by automatically understanding the affordances (action possibilities) of an environment, and reflect the understood affordances of the environment in a picture to project.

[1.2. Example System Configuration]

Figure 1:
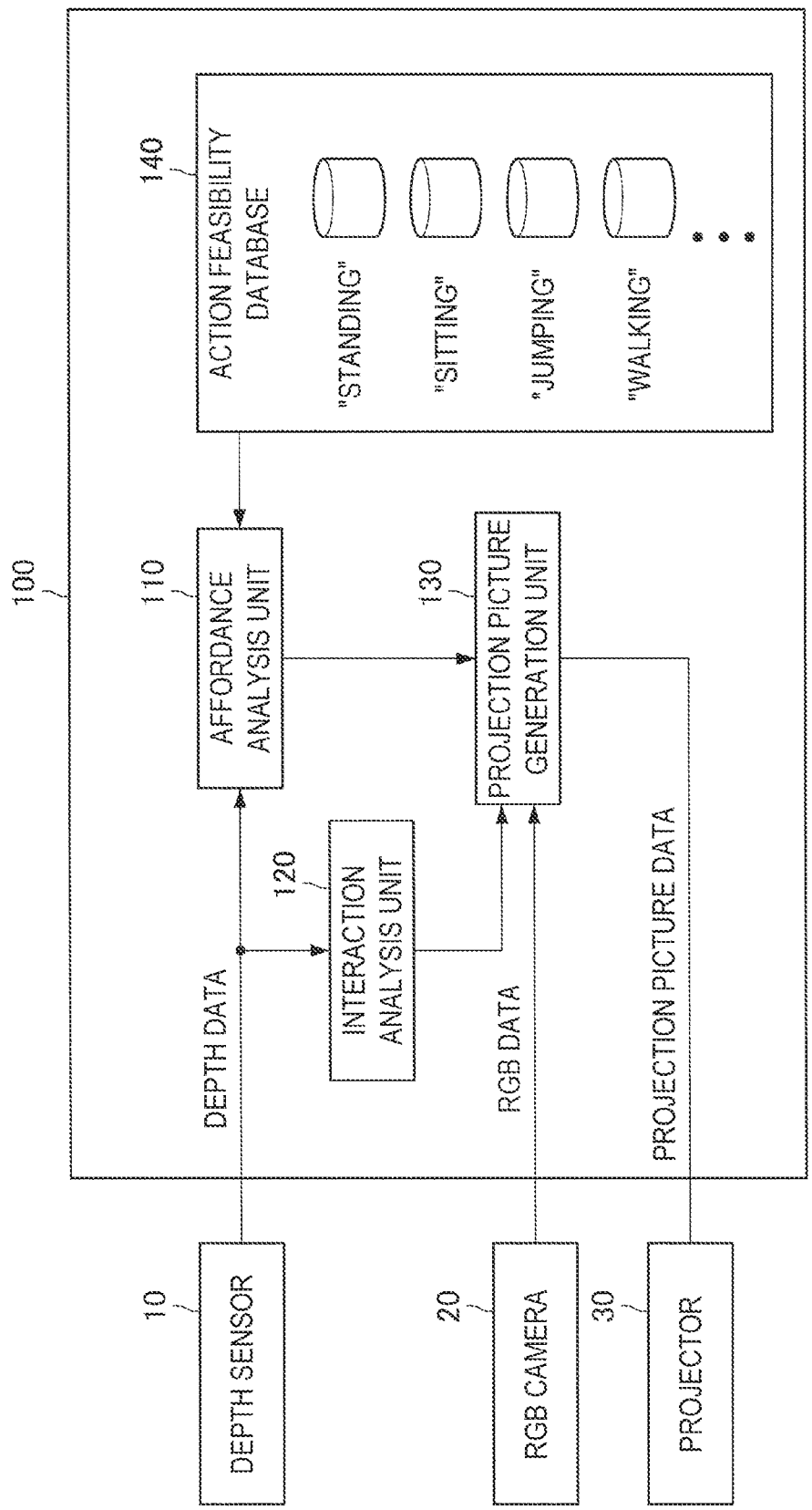
FIG. 1 is an explanatory diagram illustrating an example configuration of a projected augmented reality system according to an embodiment of the present disclosure.

Next, an example configuration of a projected augmented reality system according to an embodiment of the present disclosure will be described with reference to the drawings. FIG. 1 is an explanatory diagram illustrating an example configuration of a projected augmented reality system 1 according to an embodiment of the present disclosure. Hereinafter, an example configuration of the projected augmented reality system 1 according to an embodiment of the present disclosure will be described using FIG. 1.

The projected augmented reality system 1 illustrated in FIG. 1 is a system that overlays and displays virtual information onto objects in the real world by projecting a picture onto an environment. In the present embodiment, the environment onto which the picture is projected may be indoor or outdoor without distinction. Also, not only may any surface in the environment be treated as a target of projection for a picture, but in addition, the surface of a person's body may also be treated as a target of projection for a picture.

As illustrated in FIG. 1, the projected augmented reality system 1 according to an embodiment of the present disclosure includes a depth sensor 10, an RGB camera 20, a projector 30, and a picture playback device 100.

The depth sensor 10 is a sensor that senses the depth of an object in the environment onto which the projector 30 projects a picture. The depth sensor 10 shines infrared light onto an object, for example, and senses the depth of the object according to the degree of reflection of the infrared light. The depth sensor 10 provides depth data obtained as a sensing result to the picture playback device 100. Note that the depth sensor 10 provided in the projected augmented reality system 1 according to an embodiment of the present disclosure may be one or multiple sensors.

The RGB camera 20 is a camera that captures a moving image of the environment onto which the projector 30 projects a picture. The RGB camera 20 provides RGB data obtained as a result of picture capture to the picture playback device 100. Note that the RGB camera 20 provided in the projected augmented reality system 1 according to an embodiment of the present disclosure may be one or multiple cameras.

The projector 30 is a device that projects a picture onto an environment. The picture projected onto an environment may be a still image or a moving image. In the present embodiment, a picture to be projected by the projector 30 is generated by the picture playback device 100. The projector 30 receives projection picture data from the picture playback device 100, and emits a picture on the basis of the received projection picture data. Note that the projector 30 provided in the projected augmented reality system 1 according to an embodiment of the present disclosure may be one or multiple projectors.

As discussed earlier, in the present embodiment, the environment onto which the projector 30 projects a picture may be indoor or outdoor without distinction. Also, not only may any surface in the environment be treated as a target of projection for a picture from the projector 30, but in addition, the surface of a person's body may also be treated as a target of projection for a picture.

Figure 2:
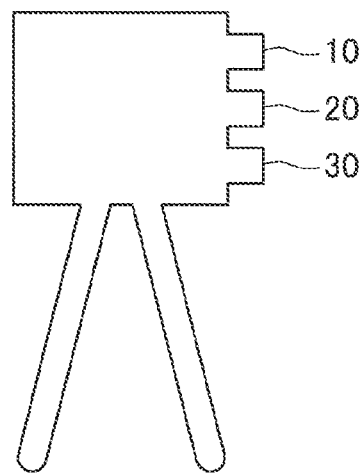
FIG. 2 is an explanatory diagram illustrating an example exterior of a device in a case in which a depth sensor, an RGB camera, and a projector are formed as an integrated device.
Figure 3:
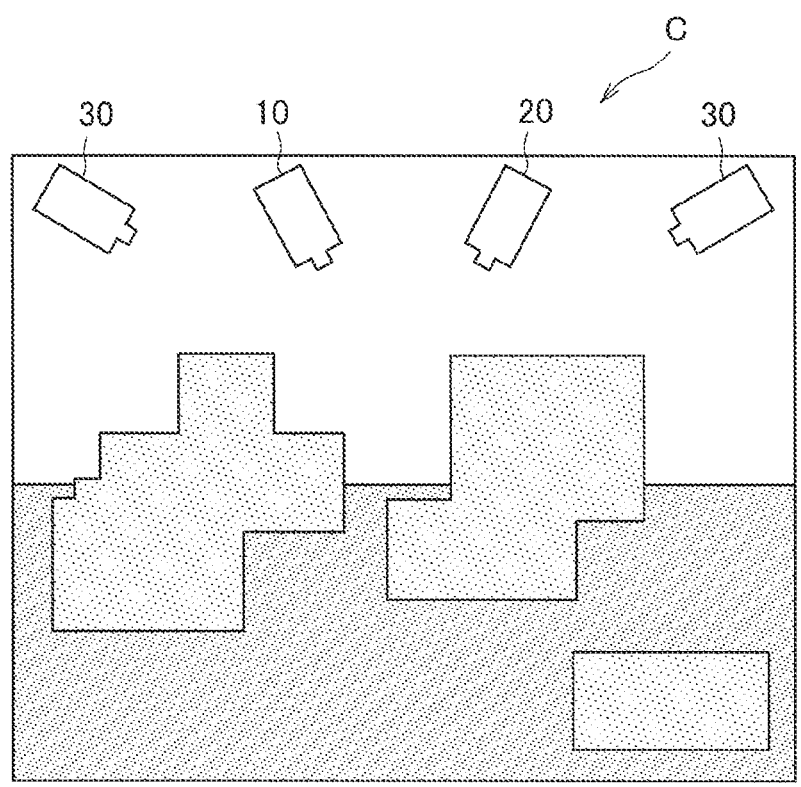
FIG. 3 is an explanatory diagram illustrating a state in which a depth sensor, an RGB camera, and a projector are installed in an environment as respectively separate devices.

The depth sensor 10, the RGB camera 20, and the projector 30 may be configured as an integrated device, or configured as separate devices. FIG. 2 is an explanatory diagram illustrating an example exterior of a device in the case in which the depth sensor 10, the RGB camera 20, and the projector 30 are formed as an integrated device. Also, FIG. 3 is an explanatory diagram illustrating a state in which the depth sensor 10, the RGB camera 20, and the projector 30 are installed as respectively separate devices in an environment C onto which the projector 30 projects a picture. Note that FIG. 3 illustrates a state in which two of the projector 30 are installed in the environment C, but as discussed earlier, the number of the depth sensor 10, the RGB camera 20, and the projector 30 is not limited to that illustrated in FIG. 3.

The picture playback device 100 is a device that generates a picture to be projected by the projector 30, on the basis of data sent from the depth sensor 10 and the RGB camera 20. The picture playback device 100 is an example of an information processing device according to the present disclosure. The picture playback device 100 understands affordances (action possibilities) of the environment onto which the projector 30 projects a picture on the basis of depth data sent from the depth sensor 10, and generates the picture to be projected by the projector 30 on the basis of the understood affordances.

As illustrated in FIG. 1, the picture playback device 100 according to the present embodiment includes an affordance analysis unit 110, an interaction analysis unit 120, a projection picture generation unit 130, and an action feasibility database 140.

The affordance analysis unit 110 uses depth data output by the depth sensor 10 to analyze the affordances (action possibilities) of the environment onto which the projector 30 projects a picture. The affordance analysis unit 110 is an example of an action possibility analysis unit of the present disclosure. Additionally, on the basis of the analysis result of the affordances of the environment, the affordance analysis unit 110 decides the feasibility of actions that a person may take with respect to the environment onto which the projector 30 projects a picture. The affordance analysis unit 110, after deciding the feasibility of actions that a person may take with respect to the environment onto which the projector 30 projects a picture, sends information about the feasibility to the projection picture generation unit 130.

The interaction analysis unit 120 uses depth data output by the depth sensor 10 to analyze the content of an action performed by a user in the environment onto which the projector 30 projects a picture. The interaction analysis unit 120 sends an analysis result of the action performed by the user in the environment onto which the projector 30 projects a picture to the projection picture generation unit 130. For example, if the user performs an action such as walking, sitting, or jumping in the environment onto which the projector 30 is projecting a picture, the interaction analysis unit 120 judges what kind of effect to produce in the picture projected by the projector 30 as a result of the action according to the analysis of depth data.

Note that the interaction analysis unit 120 may also analyze the content of an action performed by the user by using the difference between the depth data when the affordance analysis unit 110 analyzed the affordances of the environment, and the depth data when analyzing the content of the action performed by the user. Although discussed later, the depth data when the affordance analysis unit 110 analyzed the affordances of the environment is desirably depth data in an environment in which people, animals, and the like are not present. Consequently, the interaction analysis unit 120 is able to efficiently analyze the content of an action performed by the user by using the difference between the depth data when the affordance analysis unit 110 analyzed the affordances of the environment, and the depth data when analyzing the content of the action performed by the user.

The projection picture generation unit 130 generates a picture to be projected by the projector 30 by using information about the feasibility of actions that a person may take in the environment onto which the projector 30 projects a picture, which were decided by the analysis of the affordance analysis unit 110. Also, the projection picture generation unit 130 acquires the analysis result of the interaction analysis unit 120 in addition to the information from the affordance analysis unit 110, and generates a picture to be projected by the projector 30.

The projection picture generation unit 130, by using the analysis result of the affordance analysis unit 110, obviously is capable of generating a picture according to the environment, but is also capable of generating a picture according to an action the user may perform in the environment. In other words, the projection picture generation unit 130 is not only able to generate a picture that is appropriately displayed on a wall, desk, chair, table, or the like, but is also able to generate a picture so that a graphic, symbol, or the like is displayed at a position reached if the user jumps from on top of the table.

Note that when generating a picture, the projection picture generation unit 130 may also decide the color of the picture to generate on the basis of RGB data sent from the RGB camera 20. For example, the projection picture generation unit 130 may decide a color so that a picture with a red color rather than a white color is emitted from the projector 30 onto a white-colored object. As another example, the projection picture generation unit 130 may decide a color so that a picture with a yellow color rather than a blue color is emitted from the projector 30 onto a blue-colored wall.

In addition, when generating a picture, the projection picture generation unit 130 ascertains the location of the projector 30 in the environment in advance. In the case in which the depth sensor 10, the RGB camera 20, and the projector 30 are formed as an integrated device as in FIG. 2, the location of the depth sensor 10 and the location of the projector 30 are treated as being nearly the same. Consequently, the projection picture generation unit 130 is capable of ascertaining the location of the projection picture generation unit 130 from three-dimensional data of the environment obtained by the depth sensor 10.

On the other hand, in the case in which the depth sensor 10, the RGB camera 20, and the projector 30 are installed in separate locations as in FIG. 3, the user configures the location of the projector 30 in the projection picture generation unit 130 to thereby enable the projection picture generation unit 130 to ascertain the location of the projector 30.

The projection picture generation unit 130 may also estimate the position of the projector 30 by using an image captured by the RGB camera 20 of the picture projected by the projector 30. Also, the projection picture generation unit 130 may also correct the picture to be projected from the projector 30 by using an image captured by the RGB camera 20 of the picture projected by the projector 30. As another example, the projection picture generation unit 130 may also use a library for augmented reality (AR) such as ARToolkit to recognize a marker projected by the projector 30 from an image captured by the RGB camera 20, and thereby acquire the position of the projector 30.

The action feasibility database 140 is a database recording what kinds of actions may be performed or not for what shapes of objects. The action feasibility database 140 records the feasibility of actions for individual shapes with respect to each action a person may take, such as sitting, standing, walking, and jumping, for example. For example, the action feasibility database 140 approximates a three-dimensional shape with voxel data expressed on a regular grid in three-dimensional space, and then records whether or not a person's action is performable with the voxel data.

The affordance analysis unit 110 is able to analyze the affordances of the environment onto which the projector 30 projects a picture by using action feasibility data recorded in the action feasibility database 140. Although a specific example will be discussed later, the affordance analysis unit 110 may also analyze the affordances of the environment onto which the projector 30 projects a picture by cross-referencing the information in the action feasibility database 140, for example.

The action feasibility data recorded in the action feasibility database 140 is generated by performing a physical simulation on randomly generated voxel data.

The physical simulation constructs a simple model treating the human body as a combination of multiple rigid bodies, for example, and uses the model to verify whether or not a specific action may be performed.

For example, consider the case of verifying whether or not an action of "standing" is possible at coordinates (x, y, z) in the environment. In this case, if the model of the human body may be placed at the position of the coordinates (x, y, z) in the three-dimensional data of the environment without interfering with the environment and while also maintaining balance, the action of "standing" at the coordinates (x, y, z) may be judged to be possible. Cases in which the model of the human body interferes with the environment refer to cases such as when the head touches the ceiling while standing, for example. Also, cases in which placement while maintaining balance is not possible refer to cases such as when the floor is excessively tilted or the case of standing on a sharply pointed floor, for example. Verification like the above may be simulated with an extremely simple physical model.

As another example, consider the case of verifying whether or not an action of "jumping vertically" is possible at coordinates (x, y, z) in the environment. In this case, a simulation is performed to verify that there is no interference between the model of the human body and the environment and also no loss of balance when the action of "jumping vertically" starts, but in addition, to similarly verify that there is also no interference between the model of the human body and the environment during the action (that is, while jumping). For example, if there is a ceiling at a position 3 cm higher than the height of the model of the human body when standing at certain coordinates (x, y, z), "standing" may be judged to be possible, but "jumping vertically" may be judged to be impossible.

In this way, the verification procedure is different depending on the type of action, but the use of a simple model treating the human body as a combination of rigid bodies is shared in common By using a model in this way to verify whether or not specific actions may be performed, the accumulation of action feasibility data recorded in the action feasibility database 140 becomes possible.

Note that although FIG. 1 illustrates a configuration in which the action feasibility database 140 is included internally in the picture playback device 100, the present disclosure is not limited to such an example. The action feasibility database 140 may also be provided in a device separate from the picture playback device 100. When the action feasibility database 140 is provided in a separate device from the picture playback device 100, the picture playback device 100 and the separate device may be connected in a wired or wireless manner.

By including the configuration illustrated in FIG. 1, the picture playback device 100 according to an embodiment of the present disclosure is able to automatically understand affordances of an environment from depth data provided by the depth sensor 10, and cause the understood affordances of the environment to be reflected in the generation of a picture to be projected from the projector 30.

The foregoing thus describes an example configuration of the projected augmented reality system 1 according to an embodiment of the present disclosure. Next, example operation of the picture playback device 100 according to an embodiment of the present disclosure will be described.

[1.3. Example Operation]

Figure 4:
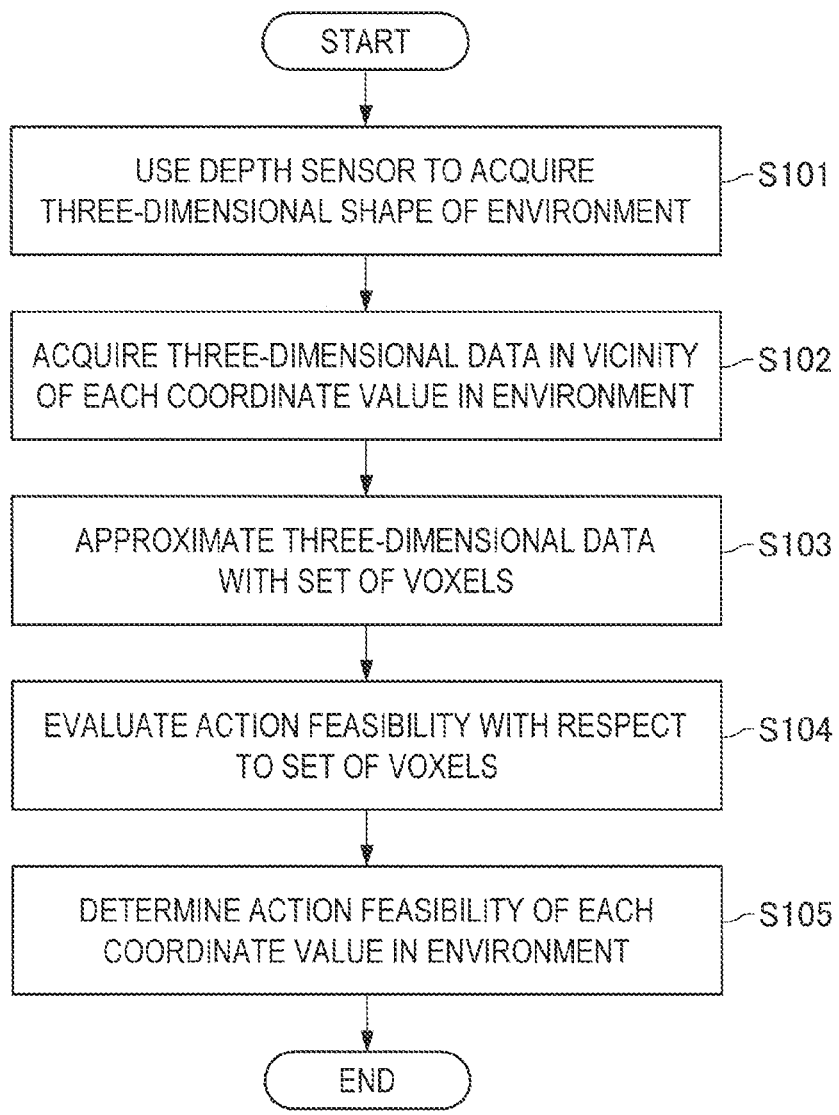
FIG. 4 is a flowchart illustrating example operation of a picture playback device according to an embodiment of the present disclosure.

FIG. 4 is a flowchart illustrating example operation of the picture playback device 100 according to an embodiment of the present disclosure. The flowchart illustrated in FIG. 4 is example operation when the picture playback device 100 determines action possibilities in the environment onto which the projector 30 shines a picture. Hereinafter, FIG. 4 will be used to describe example operation of the picture playback device 100 according to an embodiment of the present disclosure.

First, the picture playback device 100 utilizes the depth sensor 10 to acquire the three-dimensional shape of the environment in which the projector 30 is installed (step S101). The acquisition of the three-dimensional shape may be executed by the affordance analysis unit 110. Specifically, the affordance analysis unit 110 acquires the three-dimensional shape of the environment in which the projector 30 is installed by acquiring depth data provided by the depth sensor 10.

Note that when acquiring the three-dimensional shape of the environment in which the projector 30 is installed, as discussed earlier, the depth data provided by the depth sensor 10 is desirably acquired in a state in which people, animals, and the like are not present.

Figure 5:
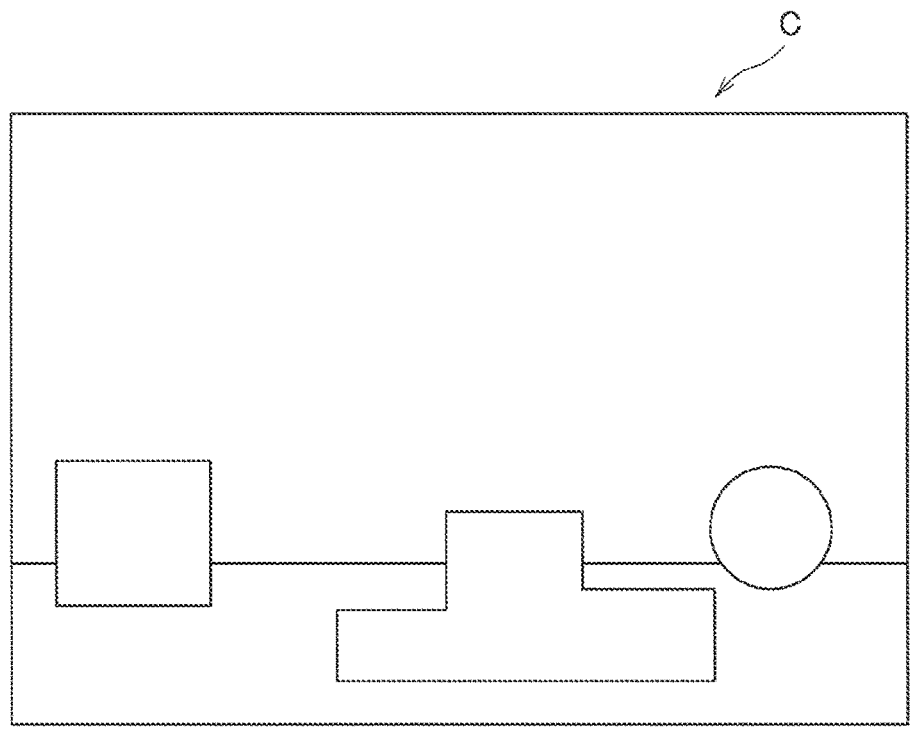
FIG. 5 is an explanatory diagram illustrating an example of an environment in which a projector is installed.

FIG. 5 is an explanatory diagram illustrating an example of an environment C in which the projector 30 is installed. By acquiring depth data from the depth sensor 10 installed in the environment C in which the projector 30 is installed, the picture playback device 100 is able to acquire the three-dimensional shape of the environment C in which the projector 30 is installed.

After acquiring the three-dimensional shape of the environment in which the projector 30 is installed in the above step 5101, the picture playback device 100 next acquires three-dimensional data in the vicinity of each coordinate value (x, y, z) in the environment (step S 102). The acquisition of three-dimensional data in the vicinity of each coordinate value (x, y, z) in the environment may be executed by the affordance analysis unit 110.

Figure 6:
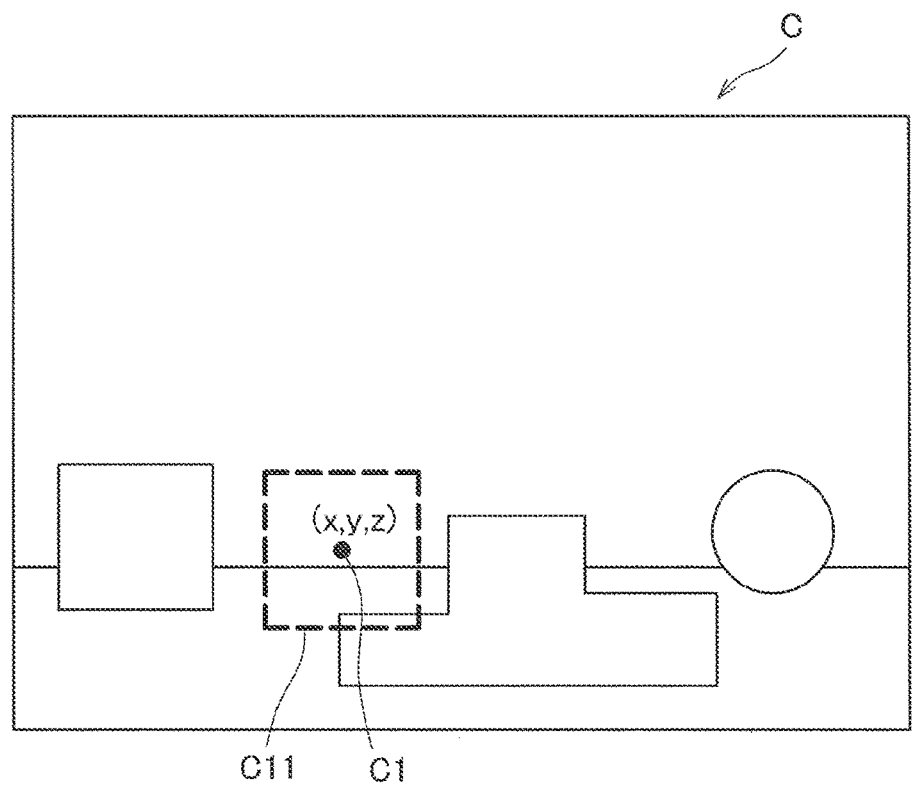
FIG. 6 is an explanatory diagram illustrating an example of acquiring three-dimensional data in the vicinity of each coordinate value of an environment.

FIG. 6 is an explanatory diagram illustrating an example of acquiring three-dimensional data in the vicinity of each coordinate value (x, y, z) of the environment C. FIG. 6 illustrates an example of acquiring three-dimensional data of a range C11 in the vicinity of a predetermined point C1 in the environment C. The range C11 is a range for judging whether or not a person is able to perform actions such as standing, sitting, walking, and jumping.

The affordance analysis unit 110 may also change the range C11 according to the action to analyze. For example, when judging a simple action that a person performs in-place, such as standing or sitting, the affordance analysis unit 110 may treat a range of approximately 50 centimeters surrounding the predetermined point C1 as the range C11 in the vicinity of the point C1. As another example, when judging an action that cannot be performed only in-place, such as walking or jumping, or when judging an action which is performed in-place but which accompanies a large action, the affordance analysis unit 110 may treat a wide range compared to the case of judging an action that a person performs in-place, such as a range of approximately 1 to 2 meters surrounding the predetermined point C1, for example, as the range C11 in the vicinity of the point C1.

After acquiring the three-dimensional data in the vicinity of each coordinate value (x, y, z) in the environment in the above step S102, the picture playback device 100 next approximates the acquired three-dimensional data in the vicinity of each coordinate value (x, y, z) with a set of voxels expressed in a regular grid in three-dimensional space (step S103). The process of approximating the three-dimensional data with a set of voxels may be executed by the affordance analysis unit 110.

Figure 7:
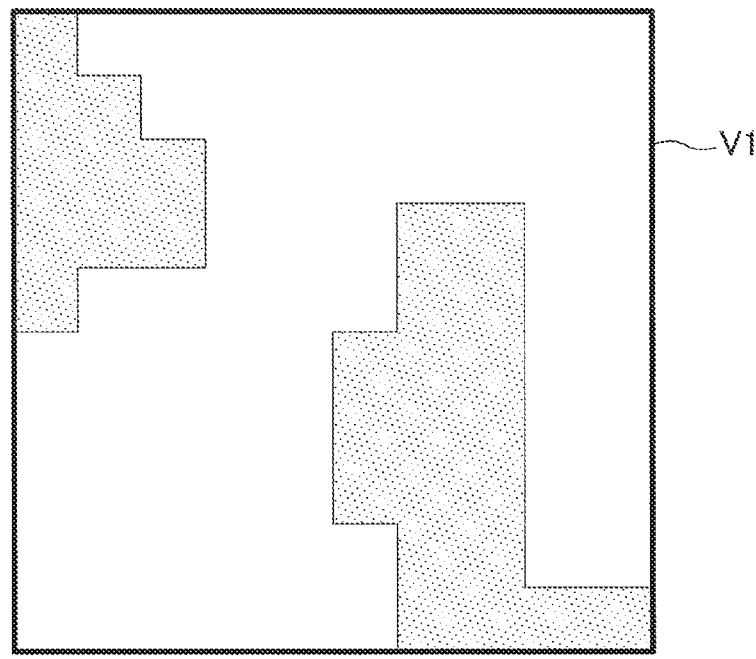
FIG. 7 is an explanatory diagram illustrating an example of a voxel.

FIG. 7 is an explanatory diagram illustrating an example of approximating three-dimensional data with a set of voxels. The set of voxels illustrated in FIG. 7 is a two-dimensional illustration as seen from an arbitrary direction for the sake of simplicity, but the actual voxels are three-dimensional data.

After approximating the three-dimensional data with a set of voxels in the above step S103, the picture playback device 100 next evaluates the action feasibility of a person with respect to the set of voxels (step S104). The process of evaluating the action feasibility of a person with respect to the set of voxels may be executed by the affordance analysis unit 110.

In the present embodiment, when evaluating the action feasibility of a person with respect to a set of voxels, data recorded in the action execution feasibility database 140 may be used. The data recorded in the action execution feasibility database 140 is information about the feasibility of actions with respect to randomly generated voxel data.

Figure 8:
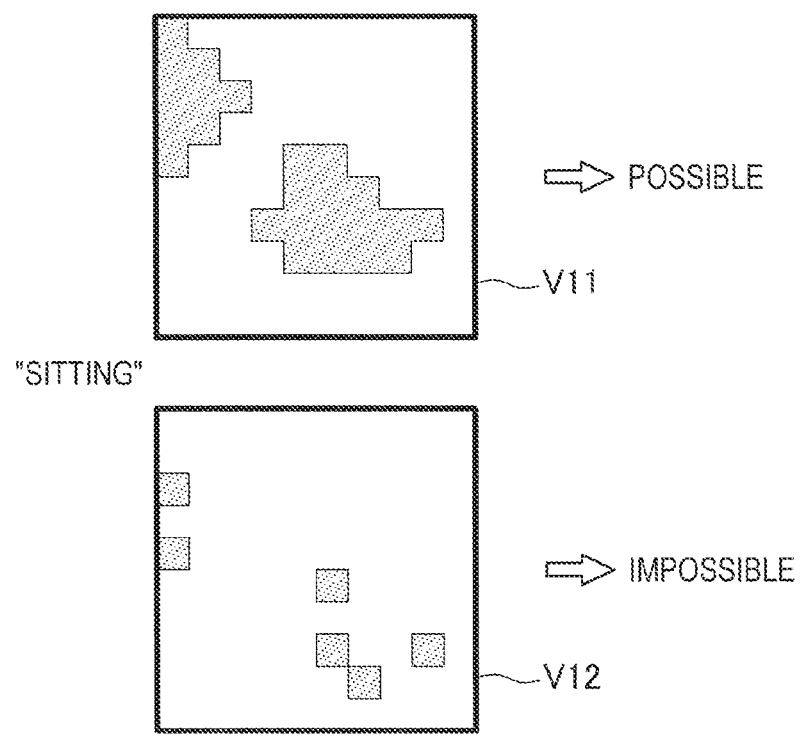
FIG. 8 is an explanatory diagram illustrating an example of randomly generated voxel data, and the execution feasibilities of actions in the voxel data.

FIG. 8 is an explanatory diagram illustrating an example of randomly generated voxel data, and the execution feasibilities of actions in the voxel data. The voxel data illustrated in FIG. 8 is an example of a case as seen from above. For example, information indicating that sitting is possible on top of a flat surface, but not possible on a spiky environment, is recorded in the action execution feasibility database 140.

The affordance analysis unit 110 cross-references the three-dimensional data approximated with a set of voxels and the data recorded in the action execution feasibility database 140, and thereby evaluates the execution feasibility of actions at each coordinate value (x, y, z) in the environment. However, the likelihood that the exact same voxels are recorded in the action execution feasibility database 140 is low.

Consequently, the affordance analysis unit 110 uses a determiner, such as a support vector machine (SVM) or a Bayesian filter, to evaluate the execution feasibility of actions at each coordinate value (x, y, z) in the environment. By providing the determiner with a large number of sample environments in which specific actions are feasible and environments in which the specific actions are not feasible, when a predetermined range of three-dimensional data centered on certain coordinates is given, the determiner is able to determine instantaneously whether or not a predetermined action is feasible in the relevant range.

Note that if the actions to be evaluated are simple ones such as "standing" and "sitting", the affordance analysis unit 110 may perform simple calculations on voxels to be evaluated, without using the determiner. For example, when evaluating the execution feasibility of the action of "standing", if there is a flat surface of a certain degree of size underneath the standing position, the affordance analysis unit 110 may also determine that a person may stand there.

After evaluating the action feasibility of a person with respect to a set of voxels, the picture playback device 100 next determines the action feasibility of each coordinate value in the environment on the basis of the evaluation result of the action feasibility of a person (step S105). The determination process may be executed by the affordance analysis unit 110.

By executing a series of operations in this way, the picture playback device 100 is able to automatically determine action possibilities in the environment onto which the projector 30 shines a picture. Additionally, by automatically determining action possibilities in the environment onto which the projector 30 shines a picture, the picture playback device 100 is able to generate a picture to be projected by the projector 30 that matches the action possibilities.

The foregoing thus describes example operation of the picture playback device 100 according to an embodiment of the present disclosure using FIG. 4. Next, examples of projecting a picture generated by the picture playback device 100 according to an embodiment of the present disclosure from the projector 30 will be illustrated.

[1.4. Examples of Projected Images]

[1.4.1. Realizing an Action Game]

First, an example will be described in which the projected augmented reality system 1 realizes an action game by projecting a picture generated by the picture playback device 100 from the projector 30. The action game described hereinafter is taken to be a game in which points are earned by defeating enemies, capturing items, and the like. With the projected augmented reality system 1 according to the present embodiment, such an action game may be realized in the real world.

Figure 9:
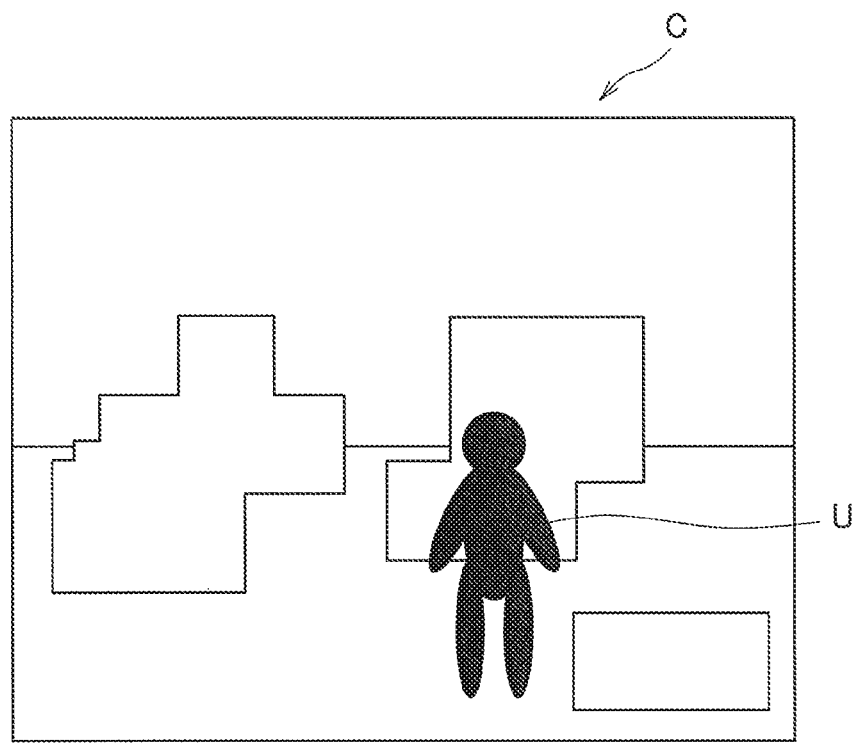
FIG. 9 is an explanatory diagram illustrating an example of an environment onto which a picture is to be projected.

FIG. 9 is an explanatory diagram illustrating an example of an environment onto which the projector 30 attempts to project a picture. By determining the action possibilities of the environment C illustrated in FIG. 9 using depth data provided from the depth sensor 10, the picture playback device 100 is able to generate a picture according to the shape and action possibilities of the environment C, and cause the projector 30 to project the generated picture. Note that FIG. 9 illustrates the form of a user U who plays the action game with the picture projected by the projector 30, but as discussed earlier, when the picture playback device 100 determines the action possibilities of the environment C, it is more desirable for the user U to be absent from the environment C.

Figure 10:
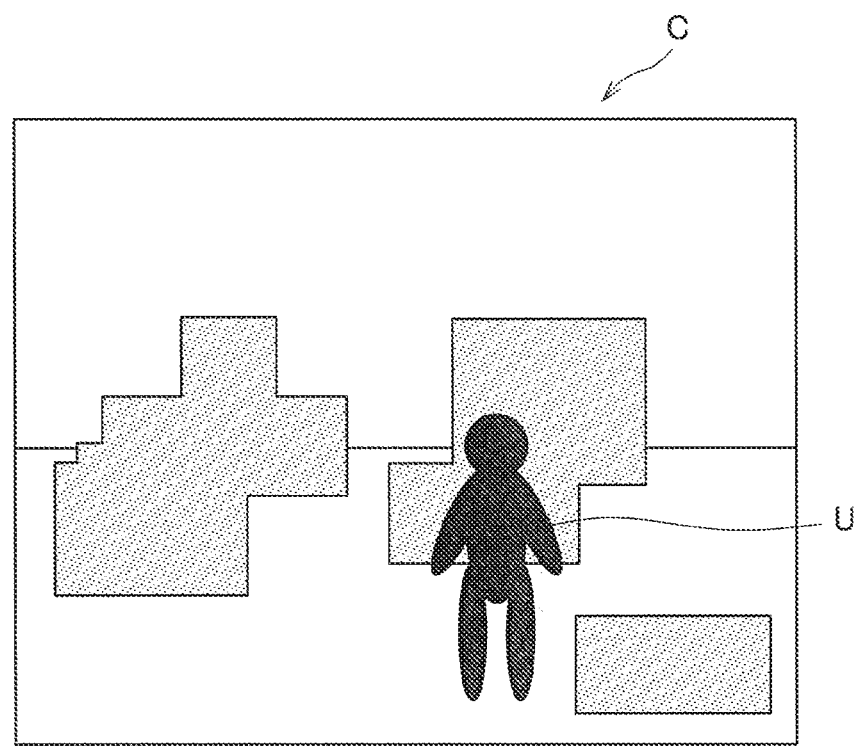
FIG. 10 is an explanatory diagram illustrating a state in which a picture is projected from a projector onto an environment.

FIG. 10 is an explanatory diagram illustrating a state in which a picture is projected from the projector 30 onto the environment C illustrated in FIG. 9. The projector 30 is able to project a picture generated by the picture playback device 100 according to the shape and action possibilities of the environment C.

Figure 11:
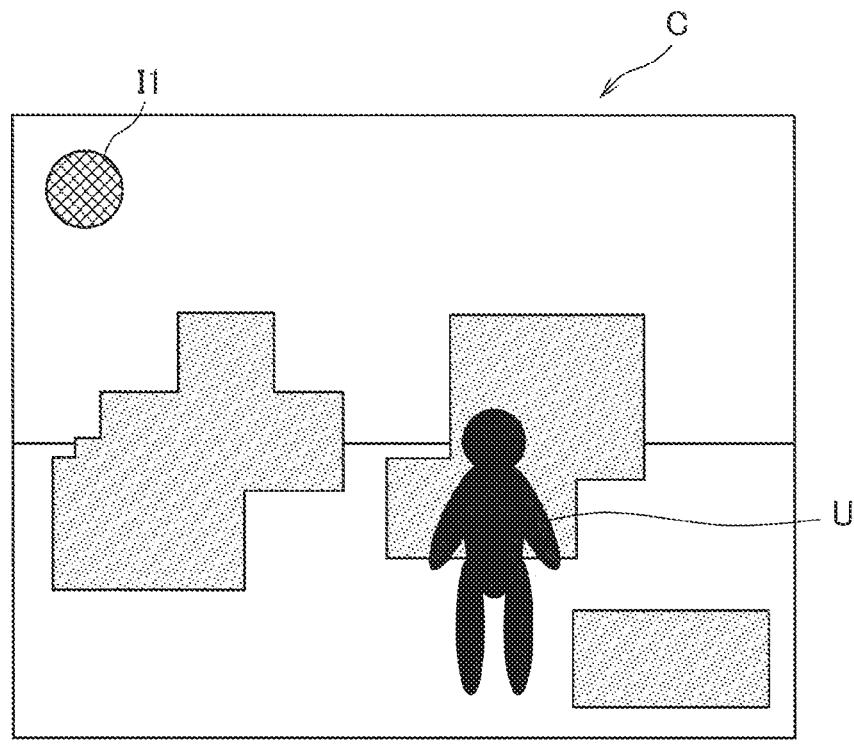
FIG. 11 is an explanatory diagram illustrating a state in which a picture is projected from a projector onto an environment.
Figure 12:
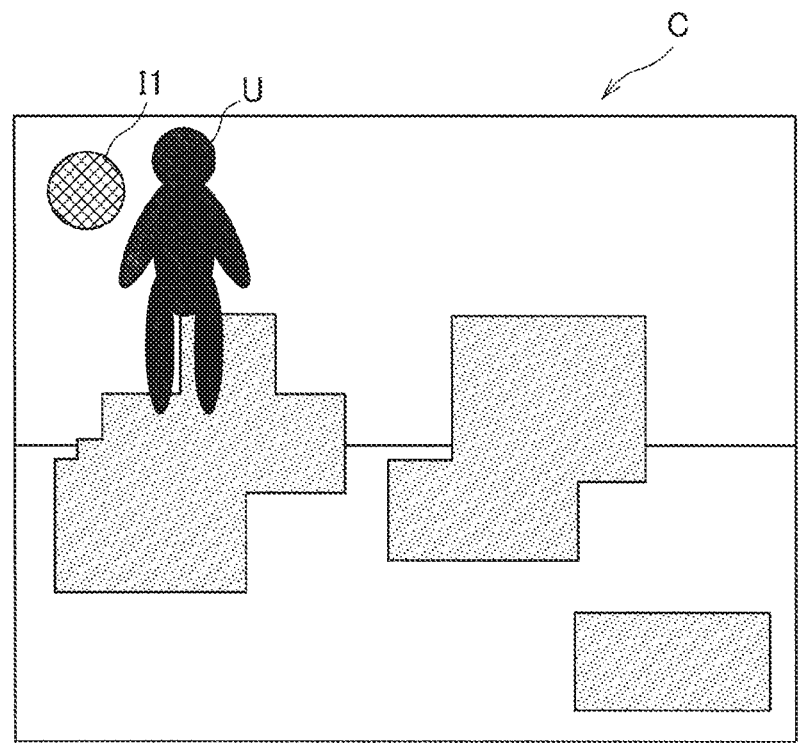
FIG. 12 is an explanatory diagram illustrating a state in which a picture is projected from a projector onto an environment.

FIGS. 11 and 12 are explanatory diagrams illustrating a state in which a picture is projected from the projector 30 onto the environment C illustrated in FIG. 9. FIGS. 11 and 12 illustrate a state in which an item I1 is being shined onto the environment C from the projector 30, in addition to the picture from the projector 30 as illustrated in FIG. 10. As illustrated in FIG. 12, the projection picture generation unit 130 decides the display position of the item I1 so that the item I1 is displayed at a location that the user U can just barely reach by jumping from the mountain on the left side of the environment C.

Figure 13:
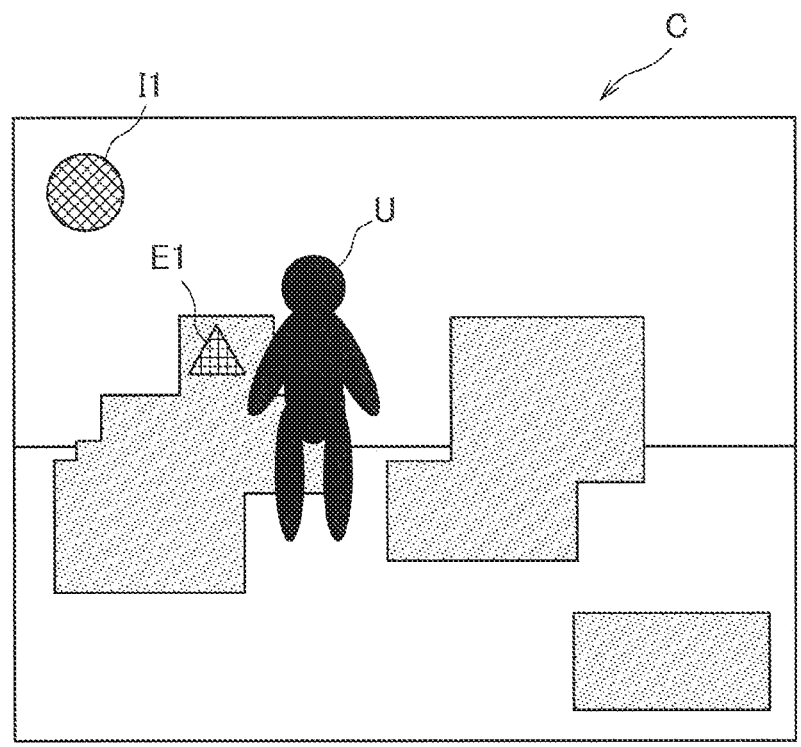
FIG. 13 is an explanatory diagram illustrating a state in which a picture is projected from a projector onto an environment.

FIG. 13 is an explanatory diagram illustrating a state in which a picture is projected from the projector 30 onto the environment C illustrated in FIG. 9. FIG. 13 illustrates a state in which an enemy E1 is being shined onto the environment C from the projector 30, in addition to the picture as illustrated in FIGS. 11 and 12. The enemy E1 obstructs the user U when the user U attempts to take the item I1.

By projecting a picture from the projector 30 in this way, an action game in which points are earned if the user U is determined to have touched the item I1 according to the analysis result of the interaction analysis unit 120 becomes realizable by the projected augmented reality system 1. Also, an action game in which points are subtracted if the user U is determined to have touched the enemy E1 according to the analysis result of the interaction analysis unit 120 becomes realizable by the projected augmented reality system 1.

[1.4.2. Realizing a Whack-a-mole Game]

Next, an example will be described in which the projected augmented reality system 1 realizes a whack-a-mole game by projecting a picture generated by the picture playback device 100 from the projector 30. A whack-a-mole game is a game in which points are earned by hitting successively appearing moles, and with the projected augmented reality system 1 according to the present embodiment, such a whack-a-mole game may be realized in the real world.

Figure 14:
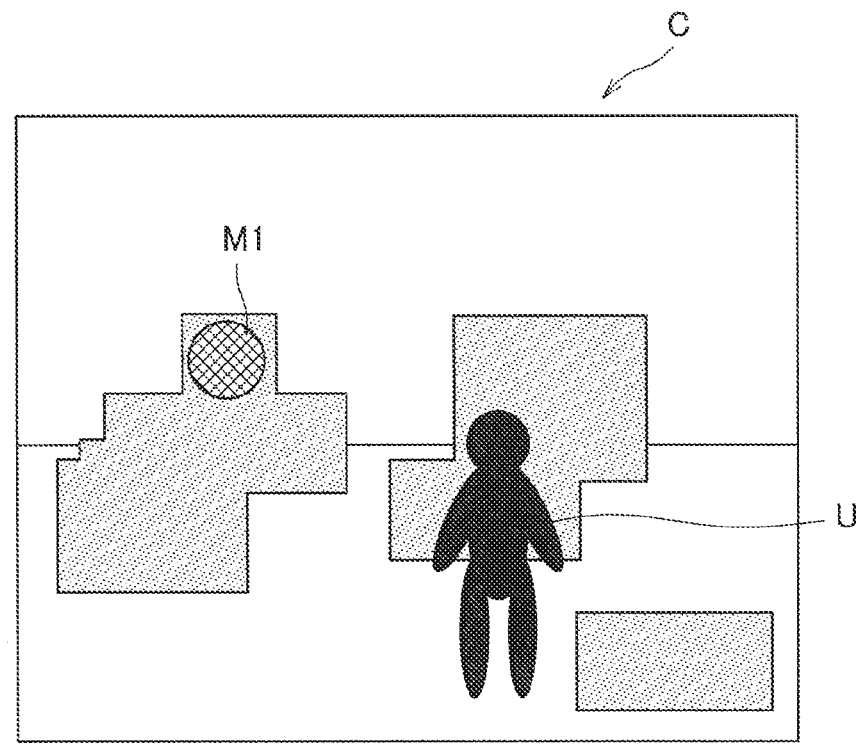
FIG. 14 is an explanatory diagram illustrating a state in which a picture is projected from a projector onto an environment.

FIG. 14 is an explanatory diagram illustrating a state in which a picture is projected from the projector 30 onto the environment C illustrated in FIG. 9. FIG. 14 illustrates a state in which a mole M1 is being shined onto the environment C from the projector 30, in addition to the picture as illustrated in FIG. 10. By projecting a picture from the projector 30 in this way, a whack-a-mole game in which the mole U disappears if the user U touches the picture of the mole M1 being shined from the projector 30 becomes realizable by the projected augmented reality system 1.

Figure 15:
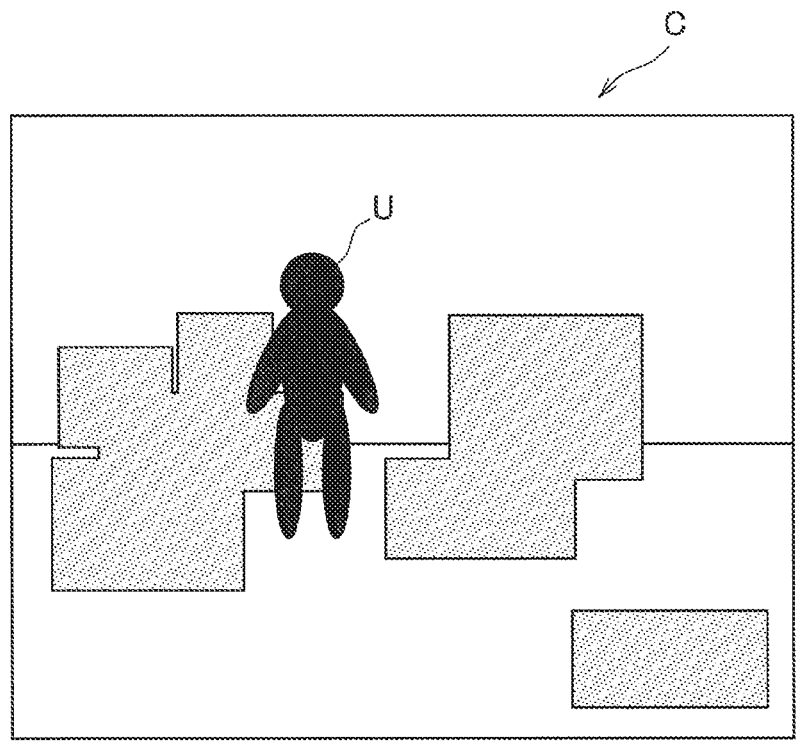
FIG. 15 is an explanatory diagram illustrating a state in which a picture is projected from a projector onto an environment.

FIG. 15 is an explanatory diagram illustrating a state in which a picture is projected from the projector 30 onto the environment C illustrated in FIG. 9. FIG. 15 illustrates a state in which the user U has touched the picture of the mole M1 illustrated in FIG. 14. As in FIG. 15, if the user U is determined to have touched the picture of the mole M1 according to the analysis result of the interaction analysis unit 120, the projection picture generation unit 130 stops the display of the mole Ml.

Figure 16:
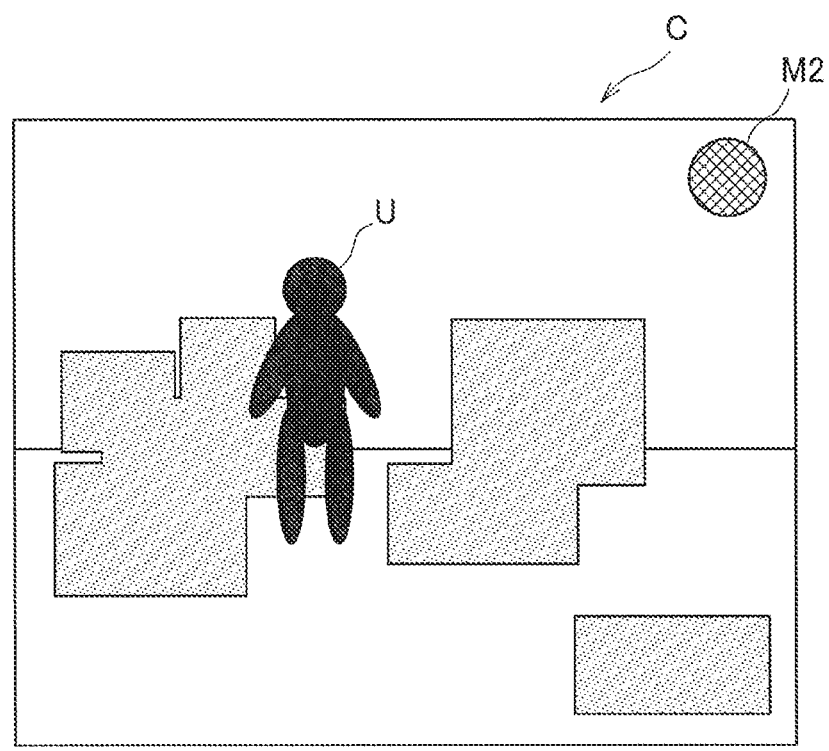
FIG. 16 is an explanatory diagram illustrating a state in which a picture is projected from a projector onto an environment.

FIG. 16 is an explanatory diagram illustrating a state in which a picture is projected from the projector 30 onto the environment C illustrated in FIG. 9. FIG. 16 illustrates a state in which a mole M1 is being shined onto the environment C from the projector 30, in addition to the picture as illustrated in FIG. 10. As illustrated in FIG. 16, after the picture of the mole M1 is touched, the projection picture generation unit 130 decides the display position of a mole M2 so that the picture of the mole M2 is displayed at a location that the user U can just barely reach if the user U hurries.

By projecting a picture from the projector 30 in this way, a whack-a-mole game in which points are earned if the user U is determined to have touched the pictures of the moles M1 and M2 according to the analysis result of the interaction analysis unit 120 becomes realizable by the projected augmented reality system 1.

[1.4.3. Realizing an Exercise Application]

Next, an example will be described in which the projected augmented reality system 1 realizes an exercise application by projecting a picture generated by the picture playback device 100 from the projector 30. The projected augmented reality system 1, on the basis of the environment onto which the projector 30 projects a picture and preregistered information such as the user's health status, is able to provide optimal exercise for the user in that environment. The information such as the user's health status may include information such as the user's sex, age, height, weight, blood pressure, and heart rate, for example.

Figure 17:
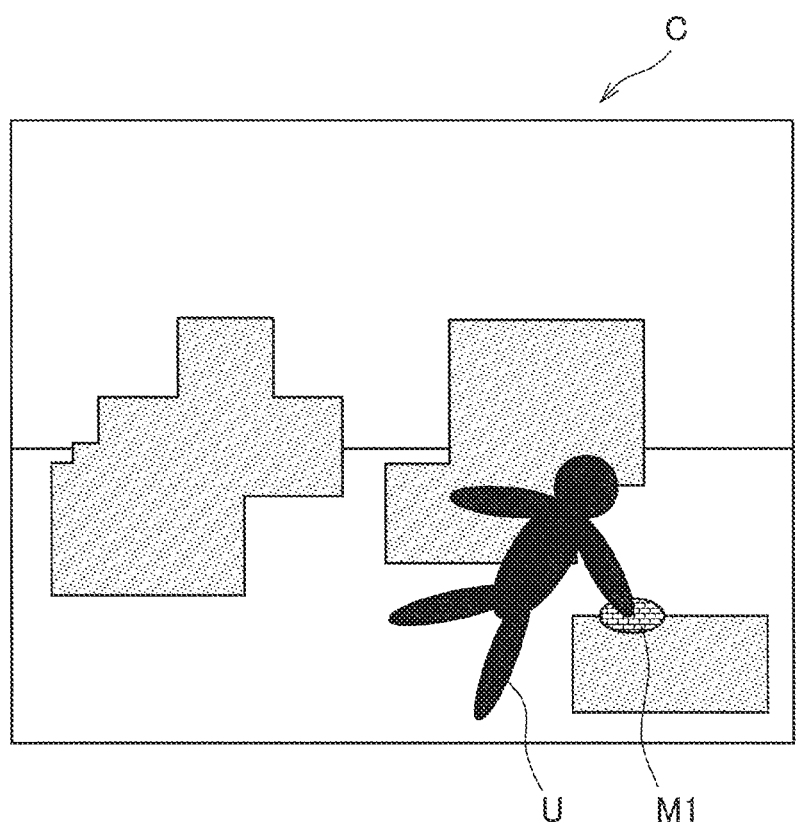
FIG. 17 is an explanatory diagram illustrating a state in which a picture is projected from a projector onto an environment.

FIG. 17 is an explanatory diagram illustrating a state in which a picture is projected from the projector 30 onto the environment C illustrated in FIG. 9. FIG. 17 illustrates a state in which a marker M1 to be touched by the hand or foot of the user U is being shined onto the environment C from the projector 30, in addition to the picture as illustrated in FIG. 10.

As illustrated in FIG. 17, the projection picture generation unit 130 decides the display position of the marker M1 so that the picture of the marker M1 is displayed at a position so as to produce an optimal exercise effect for the user U. The display position of the marker M1 may be decided on the basis of not only the affordances in the environment onto which the projector 30 projects a picture, but also the information such as the user's health status. In the example illustrated in FIG. 17, the projection picture generation unit 130 generates a picture to be projected from the projector 30 so that the marker M1 is displayed at a position so that the affordance analysis unit 110 judges that the user U is able to place a hand on the marker M1, and also a position judged to produce an optimal exercise effect for the user U.

By projecting a picture from the projector 30 in this way, an exercise application in which an exercise effect is produced in the user U by having the user U touch the picture of the marker M1 becomes realizable by the projected augmented reality system 1.

When the projected augmented reality system 1 realizes an exercise application, the projection picture generation unit 130 may also generate a picture to be projected onto the environment according to a type of exercise desired by the user. For example, when the user desires exercise to train explosiveness, the projection picture generation unit 130 may generate a picture so that the position of the marker changes after a short time, whereas when the user desires exercise to train muscle, the projection picture generation unit 130 may generate a picture so that the position of the marker does not change.

Note that obviously the games and applications realizable by the projected augmented reality system 1 are not limited to the examples discussed above. <2. Example Hardware Configuration>

Figure 18:
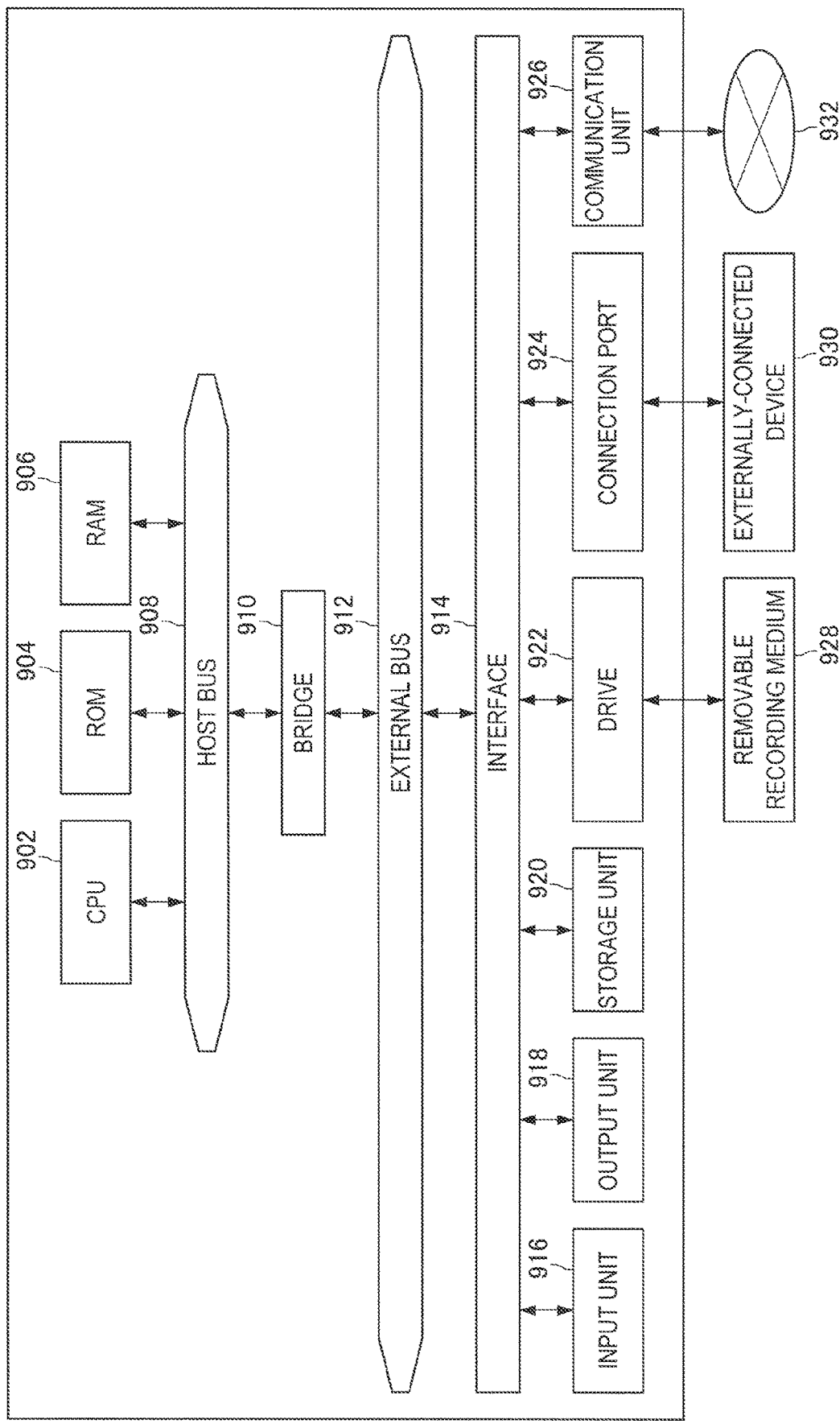
FIG. 18 is an explanatory diagram illustrating an example hardware configuration.

It is possible to execute the respective algorithms above by using the hardware configuration of an information processing device illustrated in FIG. 18, for example. In other words, the processing of each algorithm is realized by using a computer program to control the hardware illustrated in FIG. 18. Note that the format of this hardware is arbitrary, and encompasses personal computers, mobile phones, portable information devices such as PHS devices and PDAs, game consoles, contact or contactless IC chips, contact or contactless IC cards, and various information appliances, for example. Note that PHS above is an abbreviation of Personal Handy-phone System, while PDA above is an abbreviation of personal digital assistant.

As illustrated in FIG. 18, the hardware primarily includes a CPU 902, ROM 904, RAM 906, a host bus 908, and a bridge 910. The hardware additionally includes an external bus 912, an interface 914, an input unit 916, an output unit 918, a storage unit 920, a drive 922, a connection port 924, and a communication unit 926. Note that CPU above is an abbreviation of central processing unit, while ROM above is an abbreviation of read-only memory, and RAM above is an abbreviation of random access memory.

The CPU 902 functions as a computational processing device or control device, for example, and controls all or part of the operation of each structural element on the basis of various programs recorded in the ROM 904, the RAM 906, the storage unit 920, or a removable recording medium 928. The ROM 904 is a means of storing information such as programs loaded by the CPU 902 and data used in computations. The RAM 906 transiently or persistently stores information such as programs loaded by the CPU 902, and various parameters that change as appropriate when executing such programs, for example.

These structural elements are interconnected via a host bus 908 capable of high-speed data transmission, for example. Meanwhile, the host bus 908 is connected via the bridge 910 to an external bus 912 having comparatively low-speed data transmission, for example. Devices such as a mouse, keyboard, touch panel, buttons, switches, sensors, a camera, and levers may be used as the input unit 916, for example. Additionally, a remote control (hereinafter, remote) capable of using infrared or other electromagnetic waves to transmit control signals may be used as the input unit 916 in some cases.

The output unit 918 includes a device capable of visually or aurally reporting acquired information to a user, and may be a display device such as a projector, CRT, LCD, PDP, or ELD, an audio output device such as one or more speakers or headphones, a printer, a mobile phone, or a fax machine, for example. Note that CRT above is an abbreviation of cathode ray tube, while LCD above is an abbreviation of liquid crystal display, PDP above is an abbreviation of plasma display panel, and ELD above is an abbreviation of electroluminescent display.

The storage unit 920 is a device that stores various data. Devices such as a hard disk drive or other magnetic storage device, a semiconductor storage device, an optical storage device, or a magneto-optical storage device may be used as the storage unit 920, for example. Note that HDD above is an abbreviation of hard disk drive.

The drive 922 is a device that reads out information recorded onto a removable recording medium 928 such as a magnetic disk, an optical disc, a magneto-optical disc, or semiconductor memory, for example, and may also write information to the removable recording medium 928. The removable recording medium 928 is an instance of DVD media, Blu-ray media, HD DVD media, or various semiconductor storage media, for example. Obviously, the removable recording medium 928 may also be an IC card mounted with a contactless IC chip, or some other electronic equipment, for example. Note that IC above is an abbreviation of integrated circuit.

The connection port 924 is a port that connects to an externally-connected device 930, such as a USB port, an IEEE 1394 port, a SCSI port, an RS-232C port, or an optical audio terminal, for example. The externally-connected device 930 may be a printer, a portable music player, a digital camera, a digital video camera, or an IC recorder, for example. Note that the above USB is an abbreviation of Universal Serial Bus, while SCSI above is an abbreviation of Small Computer System Interface.

The communication unit 926 is a communication device that connects to a network 932, and may be a communication card for wired or wireless LAN, Bluetooth (registered trademark), or WUSB, an optical communication path, an ADSL router, or a device for contact-based or contactless communication, for example. Also, the network 932 connected to the communication unit 926 is a network connected in a wired or wireless manner, and may be the Internet, a home LAN, infrared communication, visible light communication, broadcasting, or satellite communication, for example. Note that LAN above is an abbreviation of local area network, while WUSB above is an abbreviation of Wireless USB, and ADSL above is an abbreviation of asymmetric digital subscriber line.

<3. Conclusion>

As described above, according to an embodiment of the present disclosure, there is provided a picture playback device 100 that analyzes the affordances (action possibilities) of an environment, and on the basis of the affordances, generates a picture to be projected onto the environment.

The picture playback device 100 executes, with the affordance analysis unit 110, the analysis of the affordances of the environment using depth data sent from the depth sensor 10. The affordance analysis unit 110 determines the possibility of actions that the user may take for three-dimensional data of the environment obtained from the depth data. When determining the possibility of actions that the user may take, the affordance analysis unit 110 cross-references information stored in the action feasibility database 140.

The picture playback device 100 according to an embodiment of the present disclosure, by analyzing the affordances (action possibilities) of an environment and generating a picture to project onto the environment on the basis of the affordances, is able to automatically understand the action possibilities of the environment for a person, and reflect those action possibilities in the picture to project.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, by configuring respective functional blocks shown in a functional block diagram as hardware, the hardware can achieve a series of processes.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

For example, in the foregoing embodiment, the picture is output from only the projector 30, but the present disclosure is not limited to such an example A picture taking into account the affordances of the environment may also be displayed from a display that displays a picture, in addition to the projector.

Additionally, the present technology may also be configured as below.

(1)

An information processing device including:

an action possibility analysis unit configured to acquire data of a three-dimensional shape of an environment, and by breaking down the data of the three-dimensional shape, analyzes an action possibility of the environment for a user; and a picture generation unit configured to use an analysis result of the action possibility analysis unit to generate a picture to project onto the environment.

(2)

The information processing device according to (1), wherein the action possibility analysis unit analyzes an action possibility of the environment at a predetermined position in the environment by evaluating an action feasibility of the user with respect to the data of the three-dimensional shape in a predetermined range including the predetermined position.

(3)

The information processing device according to (2), further including:

an action execution feasibility database in which execution feasibilities of user actions are recorded for individual shapes, wherein the action possibility analysis unit evaluates the action feasibility of the user by cross-referencing data stored in the action execution feasibility database.

(4)

The information processing device according to (3), wherein the action possibility analysis unit uses a support vector machine to cross-reference the data stored in the action execution feasibility database.

(5)

The information processing device according to (3) or (4), wherein in the action execution feasibility database, execution feasibilities of user actions are recorded for individual shapes by simulation against randomly generated environments.

(6)

The information processing device according to any of (2) to (5), wherein the action possibility analysis unit evaluates the action feasibility of the user by directly analyzing the data of the three-dimensional shape for a predetermined action of the user.

(7)

The information processing device according to any of (1) to (7), further including:

an interaction analysis unit configured to analyze a user action in the environment by breaking down the data of the three-dimensional shape.

(8)

The information processing device according to (7), wherein the picture generation unit generates a picture to project using an analysis result of the action possibility analysis unit and an analysis result of the interaction analysis unit.

(9)

The information processing device according to any of (1) to (8), wherein the data of the three-dimensional shape of the environment is based on depth data acquired from at least one depth sensor.

(10)

An information processing method including:

acquiring data of a three-dimensional shape of an environment, and by breaking down the data of the three-dimensional shape, analyzing an action possibility of the environment for the user; and using the analyzed action possibility to generate a picture to project onto the environment.

(11)

A computer program causing a computer to execute:

acquiring data of a three-dimensional shape of an environment, and by breaking down the data of the three-dimensional shape, analyzing an action possibility of the environment for the user; and using the analyzed action possibility to generate a picture to project onto the environment.

REFERENCE SIGNS LIST 1 projected augmented reality system
10 depth sensor
20 RGB camera
30 projector
100 picture playback device
C environment
U user

The invention claimed is:

1. An information processing device, comprising:
an action execution feasibility database in which execution feasibilities of user actions are stored for individual three-dimensional shapes of a plurality of objects;
an action possibility analysis unit configured to:
acquire data of a three-dimensional shape of at least a first object of the plurality of objects from a real world environment;
determine a plurality of coordinate values corresponding to at least the first object of the plurality of objects based on the acquired data;
cross-reference the data of the three-dimensional shape of at least the first object and the execution feasibilities stored in the action execution feasibility database;
evaluate an action feasibility of an action of a user in the real world environment with respect to the three-dimensional shape of at least the first object, in a range including the determined plurality of coordinate values, based on the cross-reference, and
predict an action possibility based on the determined plurality of coordinate values and the evaluated action feasibility, wherein the action possibility is associated with the action of the user in the real world environment; and
a picture generation unit configured to:
generate a picture based on the predicted action possibility associated with the action of the user in the real world environment; and
project the generated picture on one of the plurality of objects, wherein the action possibility is a judgment of ability to do the action in the real world environment in which the generated picture is projected.

2. The information processing device according to claim 1, wherein
the action possibility analysis unit is further configured to utilize a support vector machine to cross-reference the execution feasibilities stored in the action execution feasibility database.

3. The information processing device according to claim 1, wherein
in the action execution feasibility database, the execution feasibilities of the user actions are stored for the individual three-dimensional shapes of the plurality of objects by simulation against randomly generated environments.

4. The information processing device according to claim 1, further comprising:
an interaction analysis unit configured to analyze the action of the user in the real world environment, based on breakdown of the acquired data of the three-dimensional shape into a plurality of voxels.

5. The information processing device according to claim 4, wherein
the picture generation unit is further configured to generate and project the picture based on the predicted action possibility and an analysis result of the interaction analysis unit.

6. The information processing device according to claim 1, wherein the acquisition of the data of the three-dimensional shape of at least the first object of the plurality of objects from the real world environment is based on depth data acquired from at least one depth sensor.

7. An information processing method, comprising:
storing execution feasibilities of user actions for individual three-dimensional shapes of a plurality of objects in an action execution feasibility database;
acquiring data of a three-dimensional shape of at least a first object of the plurality of objects from a real world environment;
determining a plurality of coordinate values corresponding to at least the first object of the plurality of objects based on the acquired data;
cross-referencing the data of the three-dimensional shape of at least the first object and the execution feasibilities stored in the action execution feasibility database;
evaluating an action feasibility of an action of a user in the real world environment with respect to the three-dimensional shape of at least the first object, in a range including the determined plurality of coordinate values, based on the cross-referencing;
predicting an action possibility based on the determined plurality of coordinate values and the evaluated action feasibility, wherein the action possibility is associated with the action of the user in the real world environment;
generating a picture based on the predicted action possibility associated with the action of the user in the real world environment; and
projecting the generated picture on one of the plurality of objects,
wherein the action possibility is a judgment of ability to do the action in the real world environment in which the generated picture is projected.

8. A non-transitory computer-readable medium having stored thereon computer-executable instructions, which when executed by an apparatus, cause the apparatus to execute operations, the operations comprising:
storing execution feasibilities of user actions for individual three-dimensional shapes of a plurality of objects in an action execution feasibility database;
acquiring data of a three-dimensional shape of at least a first object of the plurality of objects from a real world environment;
determining a plurality of coordinate values corresponding to at least the first object of the plurality of objects based on the acquired data;
cross-referencing the data of the three-dimensional shape of at least the first object and the execution feasibilities stored in the action execution feasibility database;
evaluating an action feasibility of an action of a user in the real world environment with respect to the three-dimensional shape of at least the first object, in a range including the determined plurality of coordinate values, based on the cross-referencing;
predicting an action possibility based on the determined plurality of coordinate values and the evaluated action feasibility, wherein the action possibility is associated with the action of the user in the real world environment;
generating a picture based on the predicted action possibility associated with the action of the user in the real world environment; and
projecting the generated picture on one of the plurality of objects,
wherein the action possibility is a judgment of ability to do the action in the real world environment in which the generated picture is projected.

* * * * *